(No Model.)

A. J. SALTSMAN.
CAKE MIXER.

No. 581,493.  Patented Apr. 27, 1897.

Witnesses:
F. Gunter Wilhelm.
Theo. L. Popp.

A. J. Saltsman, Inventor.
By Wilhelm Bonner,
Attorneys.

UNITED STATES PATENT OFFICE.

AARON J. SALTSMAN, OF BUFFALO, NEW YORK, ASSIGNOR TO RACHEL B. SALTSMAN, OF SAME PLACE.

CAKE-MIXER.

SPECIFICATION forming part of Letters Patent No. 581,493, dated April 27, 1897.

Application filed September 21, 1896. Serial No. 606,516. (No model.)

*To all whom it may concern:*

Be it known that I, AARON J. SALTSMAN, a citizen of the United States, residing at Buffalo, in the county of Erie and State of New York, have invented a new and useful Improvement in Cake-Mixers, of which the following is a specification.

This invention relates to a beater or mixer which is designed more especially for mixing the ingredients of cake-batter, but which is equally useful for beating eggs or cream.

The object of my invention is to produce a convenient and inexpensive mixer or beater which has a large cutting area, so as to effectually divide or cut up the batter or other material and whereby the material can be thoroughly mixed or beaten in a comparatively short space of time.

Figure 1:
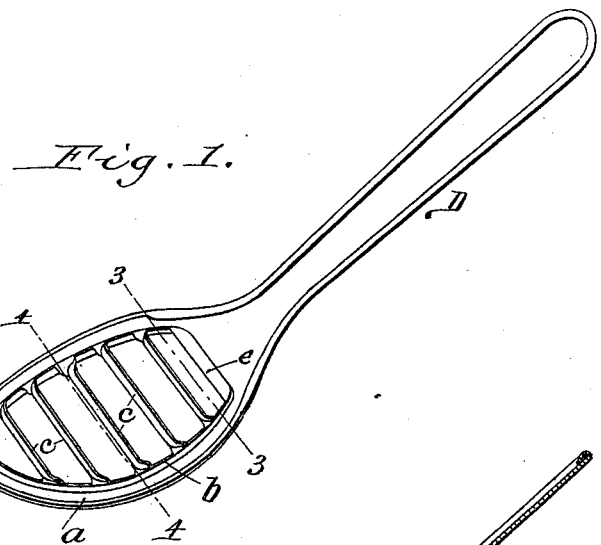
Figure 2:
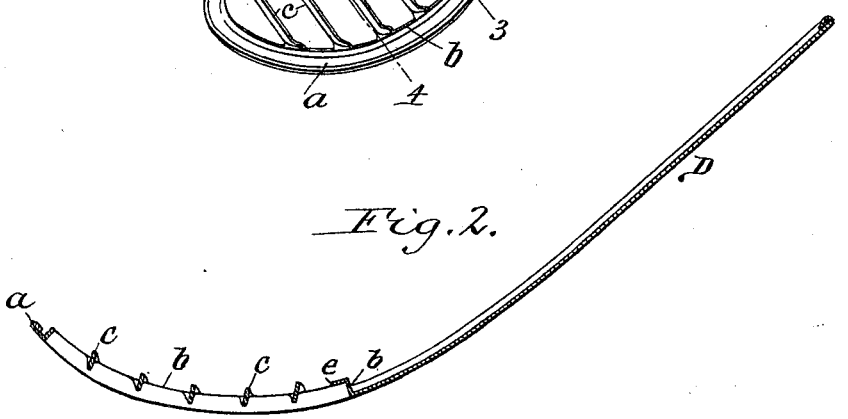
Figure 3:
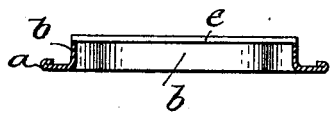
Figure 4:
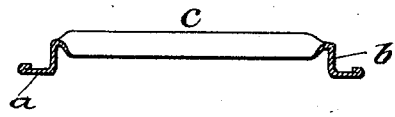

In the accompanying drawings, Figure 1 is a perspective view of my improved cake-mixer. Fig. 2 is a longitudinal section thereof. Figs. 3 and 4 are enlarged cross-sections of the same in lines 3 3 and 4 4, Fig. 1, respectively.

Like letters of reference refer to like parts in the several figures.

The mixing or beating surface of the implement is preferably bowl-shaped and comprises a substantially horizontal rim or cutting-flange $a$ of approximately oval form, an upright flange $b$, arranged at the inner edge of the rim $a$ and preferably extending entirely around the same, and bars or cutters $c$, extending across the space bounded by the flange $b$ and connected at their ends to the latter. The cutter-bars $c$ stand on edge or at right angles to the marginal rim $a$, so as to cut the batter or other material to be mixed or beaten, and they are preferably arranged transversely of the bowl or parallel with the line of movement of the bowl, as shown. A suitable handle D extends from one end of the bowl-shaped beating-surface. This handle, together with the cutting-rim $a$, flange $b$, and cutting-bars $c$, is preferably stamped in one piece from a single blank of sheet metal, such as thin sheet-iron, and the whole is then tinned to prevent rusting. In making the mixer in a single piece the cutter-bars are originally arranged in the plane of the bowl, and by a subsequent operation they are bent or twisted at right angles to that position, as shown in the drawings, so as to present their edges to the material.

The bowl of the mixer is slightly curved to render its bottom or lower side convex, so as to conform approximately to the curved bottom of a bowl or similar vessel in which the material is mixed or beaten.

In using the mixer the same is rapidly vibrated laterally in a manner common to hand mixers or beaters. The horizontally-projecting rim $a$ cuts the material in a lateral direction, while the transverse cutter-bars $c$ cut the same in a vertical direction, the divided material flowing over the upright flange $b$, which latter acts as a dam against which the material strikes after being divided by the cutting-rim.

The horizontal cutting-rim and the transverse cutting-bars form a large cutting or beating area, whereby the material is effectually and rapidly broken up and whipped, thus enabling a comparatively large amount of batter or material to be thoroughly mixed in a very short time.

The edge of the cutting-flange is preferably doubled or folded, as shown, and the edge of the handle may be wired or beaded, if desired. The rear portion of the upright flange $b$ is preferably stiffened by a transverse flange or apron $e$, which is also stamped integral with the bowl.

I claim as my invention—

1. A cake mixer or beater having a bowl provided with an external horizontal cutting-flange and an upright beating-flange standing behind or inside the cutting-flange, substantially as set forth.

2. A cake mixer or beater having a bowl composed of an external horizontal cutting-flange, an upright beating-flange standing behind or inside the cutting-flange, and flat cutting-bars arranged edge downwardly across the open space between the side portions of the upright beating-flange, substantially as set forth.

Witness my hand this 17th day of September, 1896.

AARON J. SALTSMAN.

Witnesses:
CARL F. GEYER,
KATHRYN ELMORE.